US008010463B2

(12) United States Patent
Gillen

(10) Patent No.: US 8,010,463 B2
(45) Date of Patent: Aug. 30, 2011

(54) METHOD, SYSTEM, CARRIER SERVER AND MOBILE DEVICE FOR SHIPPING A PACKAGE WITHOUT THE SHIPPER BEING REQUIRED TO APPLY A SHIPPING LABEL

(75) Inventor: Bob Gillen, Alpharetta, GA (US)

(73) Assignee: United Parcel Services of America, Inc., Atlanta, GA (US)

( * ) Notice: Subject to any disclaimer, the term of this patent is extended or adjusted under 35 U.S.C. 154(b) by 1050 days.

(21) Appl. No.: 11/425,033

(22) Filed: Jun. 19, 2006

(65) Prior Publication Data

US 2008/0004967 A1 Jan. 3, 2008

(51) Int. Cl.
*G06F 9/00* (2006.01)
*G06F 12/14* (2006.01)

(52) U.S. Cl. ........................................ 705/410; 705/405
(58) Field of Classification Search ...... 705/1, 400–411; 700/224, 225, 226, 227
See application file for complete search history.

(56) References Cited

U.S. PATENT DOCUMENTS

| 5,602,382 | A | 2/1997 | Ulvr et al. |
| 5,903,864 | A | 5/1999 | Gadbois et al. |
| 5,945,919 | A | 8/1999 | Trask |
| 6,055,520 | A * | 4/2000 | Heiden et al. ................. 705/410 |
| 6,694,248 | B2 | 2/2004 | Smith et al. |
| 6,889,194 | B1 | 5/2005 | Kadaba |
| 6,937,992 | B1 | 8/2005 | Benda et al. |
| 6,970,855 | B2 | 11/2005 | Das et al. |
| 7,853,481 | B1 * | 12/2010 | Johnson ........................ 705/26.8 |
| 2002/0099567 | A1 * | 7/2002 | Joao ................................ 705/1 |
| 2002/0152174 | A1 | 10/2002 | Woods et al. |
| 2003/0093383 | A1 * | 5/2003 | Reich et al. ..................... 705/60 |
| 2004/0073449 | A1 | 4/2004 | Yang |
| 2004/0203909 | A1 | 10/2004 | Koster |
| 2004/0230542 | A1 | 11/2004 | Obrea |
| 2004/0236707 | A1 | 11/2004 | Lingdell |
| 2005/0251402 | A1 * | 11/2005 | Olsen et al. ...................... 705/1 |

FOREIGN PATENT DOCUMENTS

WO WO 96/38800 12/1996

OTHER PUBLICATIONS

International Search Report from PCT/US2007/014418, dated Sep. 15, 2008.
Office Action for Corresponding Canadian Application No. 2,655,218 dated Aug. 9, 2010.

* cited by examiner

*Primary Examiner* — Igor Borissov
(74) *Attorney, Agent, or Firm* — Alston & Bird LLP

(57) ABSTRACT

A method, carrier server and system are provided for shipping a package wherein a shipper can arrange for shipment of a package, simply through an interactive contact with the carrier, without the need for the shipper to use official carrier documentation or forms. In particular a shipper may contact a carrier using any communication device, such as a cellular telephone, standard landline telephone, personal digital assistant (PDA), personal computer (PC), laptop, or other wired, wireless or optically-based device, in order to communicate shipping information to the carrier and, in response, receive a unique easy identifier. Thereafter, the shipper need only associate the easy identifier with the package, for example by simply hand writing the identifier on the package, and either deposit the package at the closest drop off box or carrier facility, or leave the package to be picked up by a carrier vehicle that has been, or will shortly thereafter be, dispatched fort the purpose of picking up the package.

29 Claims, 4 Drawing Sheets

METHOD, SYSTEM, CARRIER SERVER AND MOBILE DEVICE FOR SHIPPING A PACKAGE WITHOUT THE SHIPPER BEING REQUIRED TO APPLY A SHIPPING LABEL

FIELD OF THE INVENTION

The present invention generally relates to a package delivery system and, more particularly, to an efficient way of delivering packages that reduces the burden placed on shippers.

BACKGROUND OF THE INVENTION

Often the delivery of a package or packages requires significant interaction between the shipper or the shipper's agent and a carrier. For example, the shipper may have some type of formalized business relationship with a carrier, or alternatively, the shipper may directly interact with the carrier at the carrier's or the shipper's place of business. Consequently, an individual shipping a package is often required to complete at least three steps. First, the shipper may complete some form of shipping paperwork for the carrier, including a shipping label, and attach the paperwork to the package. Second, the shipper may need to find a shipment drop-off location, which may be some type of mail drop or a carrier facility. Finally, the shipper may place the package in a mail-drop location or take the package to a manned carrier facility.

Alternatively, the carrier may provide package pickup services, thus enabling the shipper to contact the carrier to arrange for a time for the package to be picked up. In this case, the shipper may be required to generate a shipping label from supplies already in his or her possession (e.g., previously provided by the carrier), generate a label image using a web-based carrier application and a printer, or generate a shipping label at the time of pickup of the package using shipping label supplies provided by the carrier representative at the time of pickup.

Unfortunately, the above described methods limit the ability of an individual shipper to make shipments in the most efficient manner. For example, when an individual shipper engages in extensive travel, he or she may not have access to convenient drop-off facilities, a printer to generate a label image, and/or the shipper may not be able to schedule a convenient pickup time for his or her package.

A need, therefore, exists for a more efficient system and method for processing intake of packages that cuts down on the amount of required interaction between a shipper and a carrier, as well as on the amount of equipment and/or supplies needed by the shipper at the time of shipment.

BRIEF SUMMARY OF THE INVENTION

Exemplary embodiments of the present invention provide an improvement over the known prior art by, among other things, providing a method of shipping a package wherein a shipper can arrange for shipment of a package, simply through an interactive contact with the carrier, without the need for the shipper to use official carrier documentation or forms. In particular, exemplary embodiments of the present invention enable a shipper to contact a carrier using any communication device, such as a cellular telephone, standard landline telephone, personal digital assistant (PDA), pager, personal computer (PC), laptop, or other wired, wireless or optically-based device, in order to communicate shipping information to the carrier and, in response, receive a unique easy identifier. Thereafter, the shipper need only associate the easy identifier with the package, for example by simply handwriting the identifier on the package, and either deposit the package at the closest drop off box or carrier facility, or leave the package to be picked up by a carrier vehicle that has been, or will shortly thereafter be, dispatched for the purpose of picking up the package.

According to one aspect of the present invention, a method is provided for shipping a package that eliminates the need for a shipper to apply a shipping label to the package. In one exemplary embodiment, the method includes: (1) receiving shipment data for shipping a package from a shipper device via a communications network; (2) associating an easy identifier with the shipment data received; (3) transmitting the easy identifier to the shipper device via the communication network, such that the easy identifier is capable of being associated with the package; (4) receiving a signal from a carrier device that comprises the easy identifier associated with the package, wherein the easy identifier was captured from the package by the carrier device; (5) retrieving the shipment data based on the easy identifier; and (6) causing a shipping label to be generated based at least in part on the shipment data retrieved, wherein the shipping label is capable of being affixed to the package by a carrier at a pickup processing location upon receipt of the package associated with the easy identifier.

According to yet another aspect of the present invention, a system is provided for use in shipping a package that eliminates the need for a shipper to apply a shipping label to the package. In one exemplary embodiment, the system includes a carrier server, data acquisition device, label generation device, and printing device. The carrier server of one exemplary embodiment is capable of receiving shipment data for shipping a package from a shipper device via a communication network and storing the shipment data received. The carrier server may further be capable of associating an easy identifier with the stored shipment data, such that the shipment data can be retrieved based on the easy identifier. In addition, the carrier server may be capable of transmitting the easy identifier to the shipper device, such that the easy identifier can be associated with the package by the shipper.

In one exemplary embodiment, the data acquisition device is capable of capturing the easy identifier from a package with which the easy identifier is associated and retrieving the shipment data stored by the carrier server using the captured easy identifier. The label generation device of one exemplary embodiment may be in communication with the data acquisition device and may be capable of generating a shipping label based at least in part on the shipment data retrieved by the data acquisition device. The printing device may be in communication with the label generation device and may further be capable of printing the shipping label, such that the shipping label can be affixed by a carrier at a pickup processing location upon receipt of the package associated with the easy identifier.

According to another aspect of the present invention, a carrier server capable of providing shipment of a package without the need for a shipper to apply a shipping label to the package is provided. In one exemplary embodiment, the carrier server comprises a processor and a memory that is in communication with the processor and that stores an application executable by the processor. The application of one exemplary embodiment is capable, upon execution, of: (1) receiving shipment data for shipping a package from a shipper device via a communications network; (2) associating an easy identifier with the shipment data received; (3) transmitting the easy identifier to the shipper device, such that the easy identifier is capable of being associated with the package; (4)

receiving a signal from a carrier device that comprises the easy identifier associated with the package, wherein the easy identifier was captured from the package by the carrier device; (5) retrieving the shipment data based on the easy identifier; and (6) causing a shipping label to be generated based at least in part on the shipment data retrieved, wherein the shipping label is capable of being affixed to the package by a carrier at a pickup processing location upon receipt of the package associated with the easy identifier.

According to yet another aspect of the present invention, a method is provided, wherein in one exemplary embodiment the method includes: (1) by or on behalf of the shipper, (a) entering shipment data for shipping a package into a shipper device; and (b) transmitting the shipment data from the shipper device to a carrier computer system via a communications network; (2) by the carrier computer system, (a) in response to receiving the shipment data, producing an easy identifier; (b) storing the shipment data in association with the easy identifier; and (c) transmitting the easy identifier from the carrier computer system to the shipper device via the communications network; (3) by or on behalf of the shipper, (a) in response to receiving the easy identifier, associating the easy identifier with the package; and (b) providing the package with the associated easy identifier to the carrier for delivery to a destination indicated by the shipment data; and (4) by the carrier, (a) receiving the package with associated easy identifier at a pickup processing location of the carrier; (b) retrieving the shipment data from the carrier computer system at the pickup processing location based on the easy identifier; (c) generating a shipping label based at least in part on the retrieved shipment data at the pickup processing location; (d) applying the shipment label to the package at the pickup processing location; and (e) shipping the package based on the shipment data on the shipment label.

According to another aspect of the present invention, a further method is provided, wherein in one exemplary embodiment the method includes: (1) providing shipping information to a carrier with a mobile communication device, the shipping information indicating a destination of a package to be shipped; (2) in response to providing the shipping information, receiving an easy identifier with the mobile communication device; (3) handwriting the easy identifier on the package; and (4) providing the package having the handwritten easy identifier to a carrier for delivery to the destination indicated by the shipping information.

According to yet another aspect of the present invention, a mobile device is provided that is capable of initiating shipment of a package without a shipper being required to apply a shipping label. In one exemplary embodiment, the mobile device includes a processor and a memory, wherein the memory stores an application that is executable by the processor. The application of this exemplary embodiment may be configured, upon execution, to: (1) receive a command to ship a package; (2) receive shipping information relating to the package; (3) provide the shipping information to a carrier system; (4) receive, in response, a unique easy identifier associated with the shipping information provided; and (5) display the unique easy identifier, such that a user associated with mobile device is capable of applying the unique easy identifier to the package prior to providing the package to the carrier service.

In exemplary embodiments, in order to receive shipping information, the application may further be configured, upon execution, to receive an identification of a party to whom the package is to be shipped and/or of a location from which the package is to be shipped, and to access previously stored shipping information associated with the party or location identified. In particular, in a further exemplary embodiment, the identifications may be received by way of a voice signal corresponding with the identification of the party and/or location, respectively. In yet another exemplary embodiment, the application may further be configured, upon execution, to capture an image associated with the package to be shipped, such that providing the shipping information to the carrier system involves providing the image captured.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
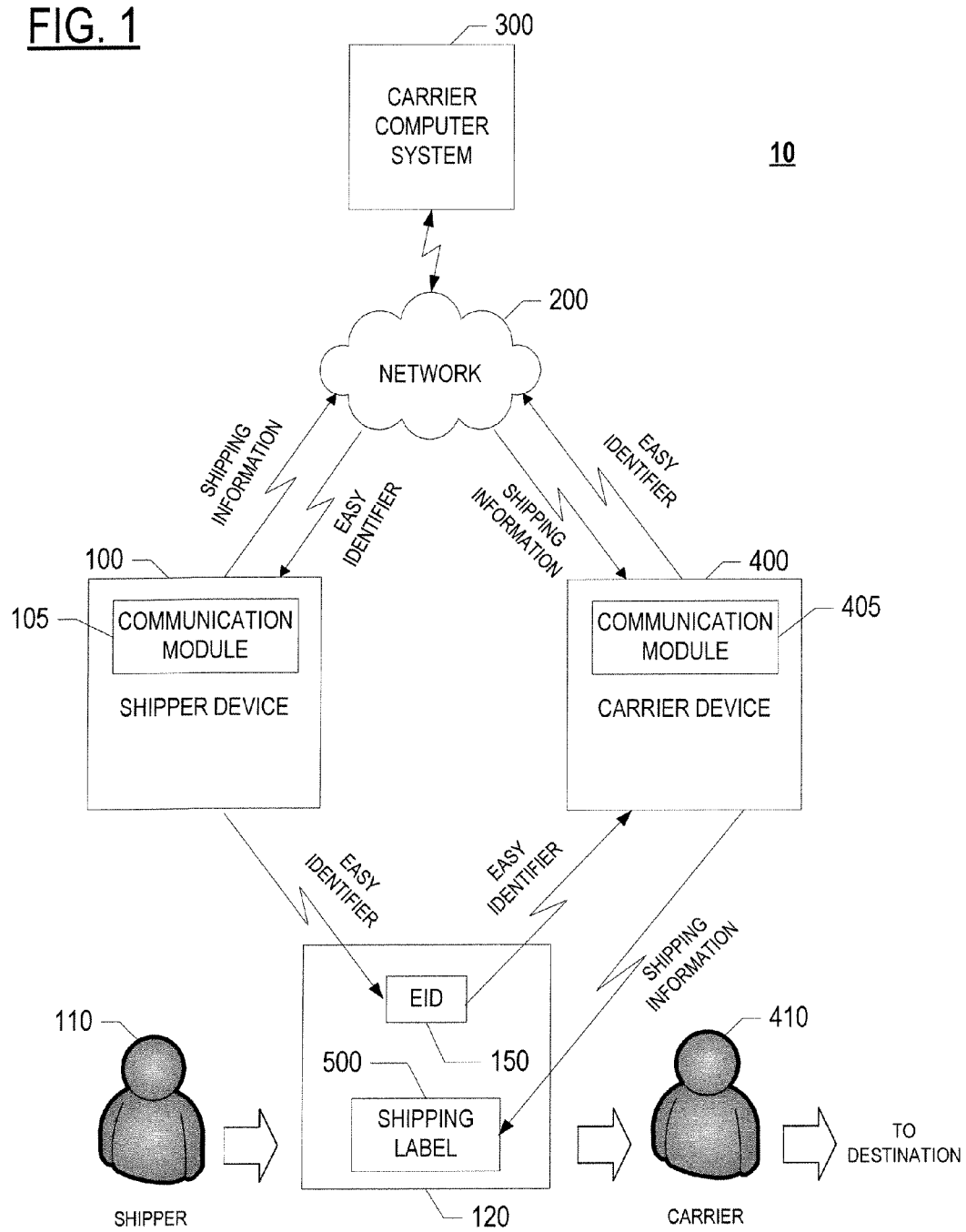
FIG. 1 is a block diagram of one system that would benefit from exemplary embodiments of the present invention.

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Glossary:

As used herein, the term 'network' may refer to any communication network, such as a Public Switched Telephone Network (PSTN), Local Area Network (LAN), Metropolitan Area Network (MAN), and/or Wide Area Network (WAN), to name a few. In particular, the network of exemplary embodiments of the present invention may comprise any mobile network capable of supporting communication in accordance with any one or more of a number of first-generation (1G), second-generation (2G), 2.5G, or third-generation (3G) mobile communication protocols or the like. More particularly, the shipper device, carrier computer system or carrier device of exemplary embodiments may be coupled to one or more networks capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. In addition, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrowband AMPS (NAMPS), as well as TACS, network(s) may also benefit from embodiments of the present invention, as should dual or higher mode mobile stations (e.g., digital/analog or TDMA/CDMA/analog phones).

'Mobile communication device' may refer to any device capable of communicating voice and/or data over a mobile communication network. Such mobile communication device can be, for example, a cellular telephone, personal digital assistant (PDA), mobile personal computer (PC) or laptop, pager, or the like.

'Computer' or 'computing device' broadly refers to any kind of device which receives input data, processes that data under computer instructions in a program or object, and generates output data such as Radio Frequency Identification (RFID) tag data. Such computer can be a hand-held device, laptop computer, desktop computer, miniframe, mainframe, server, or other computer, for example. A 'computer' generally includes a processor and a memory, and input and output units with an interface unit enabling connection to other computers or devices.

'Connected' or 'coupled' refer to a physical connection between two computers permitting communication of data. Two devices can be connected directly together or indirectly through one or more intermediate elements, to permit communication of data/signal from one device to the other. Connection media include wire, optical fiber, or wireless transmission media such as air or space, permitting communication of data or a signal.

'Data storage unit' is any device capable of storing data, including random-access memory (RAM), read-only memory (ROM), electrically-erasable read-only memory (EEPROM), hard disk and disk drives, compact disc (CD), digital versatile disc (DVD), magnetic tapes and tape drives, optical storage media, quantum memory devices, and any other device that can be used to store data in readable form.

'Input unit' or 'input device' can be a keyboard, keypad, mouse, wand, stylus, voice receiver, or any other device capable of receiving input data from a human user. 'Interface unit' or 'interface card' can be a network interface card (NIC), a modem, or other interface device.

'Memory' can be any device capable of storing data, including random-access memory (RAM), read-only memory (ROM), electrically-erasable read-only memory (EEPROM), hard disk and disk drives, compact disc (CD), digital versatile disc (DVD), magnetic tapes and tape drives, optical storage media, quantum memory devices, and any other device that can be used to store data in readable form.

'Output unit' or 'output device' can be a display monitor (e.g., CRT or flat panel display), speaker, vibration unit, or any other device that can be used in a computer to generate a humanly perceptible presentation.

'Processor' can be any device capable of receiving, processing, and outputting data under execution of a computer program or object, including a microprocessor, microcontroller, programmable gate array (PGA), field programmable gate array (FPGA), programmed array logic (PAL), programmable logic array (PLA), or other such device.

'Server' is a computer. The term can have a more refined meaning as a computer that executes a server application responsive to computers executing client applications or the like, i.e., client-server architectures.

Overview:

In general, according to exemplary embodiments of the present invention, an individual is able to arrange for shipment of a package, regardless of where he or she is currently located, without requiring access to supplies or equipment, such as shipping labels or printers. To illustrate, imagine an individual who is at an airport awaiting his or her flight and would like to have a package shipped, for example, to his home. Using the technique of exemplary embodiments of the present invention, the individual is able to use, for example, his or her cellular telephone to contact the carrier and provide the necessary shipping information or shipment data (e.g., his or her home address). The individual may, for example, use a Hypertext Markup Language (HTML) browser on his or her cellular telephone to access a carrier website or send a text message (e.g., a Short Message Service (SMS) message) to the carrier system. Alternatively, he or she may have a conversation with an operator associated with the carrier, or use an application installed on his or her cellular telephone that allows the individual to enter and transmit the requisite information. In particular, in one exemplary embodiment, the application may enable the individual to provide the shipping information via one or more voice commands, or even an image of the package to be shipped.

In response, the individual will receive a unique easy identifier (e.g., a 10-digit alphanumeric code) that has been correlated with the shipping information provided, and which he or she need only hand write on the package in order for the package to be ready for shipment. In addition, the individual may receive the location of the nearest drop off box or carrier facility to which he or she can take the package; for example, if one happened to be in the airport, in which the individual is waiting. Alternatively, the individual may request that the nearest available vehicle be dispatched, in which case the individual may simply leave the package for pickup, for example at the airport customer service desk. Upon receipt of the package, the carrier will use the unique easy identifier to ascertain the shipping information, and then generate and affix the standard shipping label to the package. The package is thereafter able to enter the shipping system in the ordinary manner.

As used herein, and as discussed in more detail below, the term "easy identifier" refers to any combination of some predetermined number of characters including, for example, numbers, letters, and/or symbols, that is capable of being correlated with shipping information provided by a shipper and thereafter provided to the shipper for associating with the package to be shipped. Use of the term "easy" to describe the identifier is not meant to impose any limitation whatsoever as to the complexity of the combination of characters and, therefore, should not be taken as limiting the scope of the present invention in any way. Rather, the term "easy identifier" refers to the ease with which an individual can ship a package using the method of exemplary embodiments of the present invention, not the complexity of the identifier used.

Overall System:

Referring to FIG. 1, an illustration of one type of system that would benefit from exemplary embodiments of the present invention is provided. As shown, the system 10 may include a shipper device 100 connected via a network 200 to a carrier computer system 300. In one exemplary embodiment, the shipper device 100 may comprise a communication module 105 comprised of software, for example, operating on a processor (not shown) located on the shipper device 100. The communication module 105 may be capable of communicating shipping information relating to a package 120 to be shipped to the carrier computer system 300 via the network 200 and, in response, receiving a unique easy identifier 150 from the carrier computer system 300 that can be associated with the package 120 prior to providing the package 120 to a carrier for shipment.

In one exemplary embodiment, the carrier computer system 300 further comprises a server 310 and a data storage unit 320 (shown in FIG. 2) for processing the shipping information received from the shipper via the communication module 105 of the shipper device 100 and associating that information with the easy identifier. The server 310 may store the shipping information and easy identifier in association with one another in the data storage unit 320 (discussed in further detail below with respect to FIGS. 2, 3A and 3B).

The system of exemplary embodiments may further include a carrier device 400 also in communication with the carrier computer system 300 over the same or different network 200, for the purpose of retrieving shipping information based on an easy identifier 150 that was obtained from a package 120 picked up by the carrier for delivery. For this purpose, the carrier device 400 of exemplary embodiments may likewise comprise a communication module 405 capable of transmitting the easy identifier 150 to the carrier computer system 300 and, in response, receiving the shipping information from the carrier computer system 300. Upon receipt of the shipping information, the carrier may generate a shipping label 500, which can be affixed to the package 120 prior to shipment of the package 120 to its destination.

As noted above, the shipper device 100 may be any device operable by a shipper that is capable of communicating voice and/or data over a network. This may include, for example, a landline telephone, cellular telephone, PDA, pager, PC, laptop, camera phone, or the like. The shipper device 100 may or may not be associated with the shipper him/herself. For example, the shipper may use his or her personal cellular telephone, PDA or laptop (i.e., a device "associated" with the shipper). Alternatively, he or she may use a payphone or computer available in, for example, a hotel lobby or airport (i.e., devices "not associated" with the shipper) to transmit the requisite shipping information and receive the unique easy identifier 150.

The carrier device 400 may be any portable data acquisition device associated with a carrier that is capable of receiving data via any number of input units or devices, such as a keypad, touchpad, barcode scanner, radio frequency identification (RFID) reader, interface card (e.g., modem, etc.) or receiver. The carrier device 400 may further be capable of storing data to one or more volatile or non-volatile memory modules, and outputting the data via one or more output units or devices, for example, by displaying data to the carrier operating the device 400, or transmitting data, for example over the communication network 200. One type of carrier device 400, which may be used in conjunction with exemplary embodiments of the present invention is the Delivery Information Acquisition Device (DIAD) presently utilized by UPS.

As is discussed in more detail below, in one exemplary embodiment, the shipper device 100 may communicate with the carrier computer system 300 via an operator (not shown) who is responsible for receiving the requisite shipping information from the shipper and accessing the carrier computer system 300 in order to determine and provide the shipper with the easy identifier. Alternatively, the shipper device 100 may directly access the carrier computer system 300, for example, by using an HTML browser to access a web-based application operating on the carrier computer system 300.

Although the shipper device 100 and carrier device 400 are illustrated in FIG. 1 as communicating with the carrier computer system 300 over the same network 200, as one of ordinary skill in the art will recognize, these devices may likewise communicate over separate networks. For example, while the shipper may communicate with the carrier computer system 300 using his or her landline phone over the PSTN, the carrier may use his or her carrier device 400 to communicate with the carrier computer system 300 over a Wireless WAN.

Figure 2:
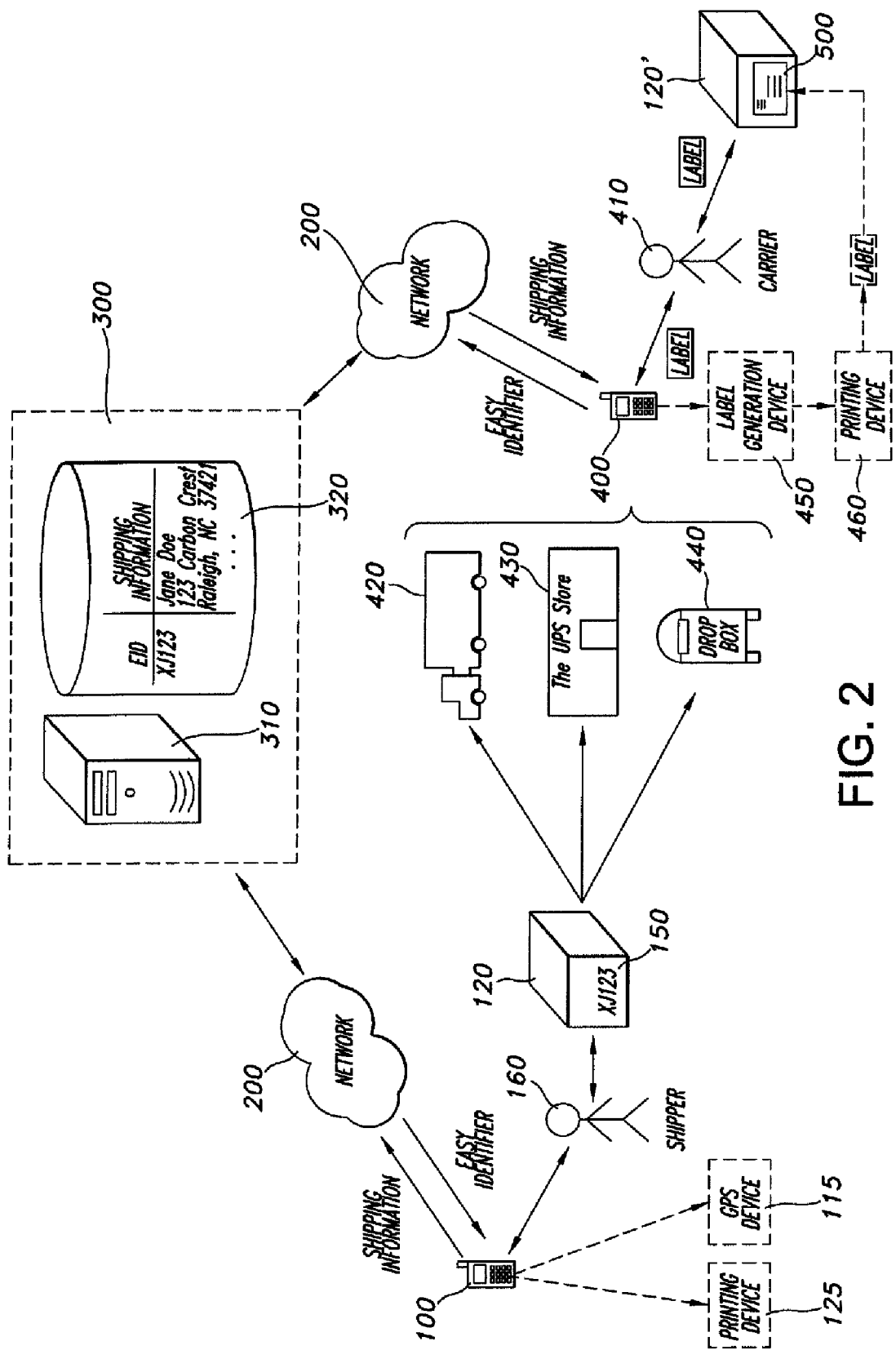
FIG. 2 illustrates, in more detail, a system that would benefit from exemplary embodiments of the present invention.
Figure 3A:
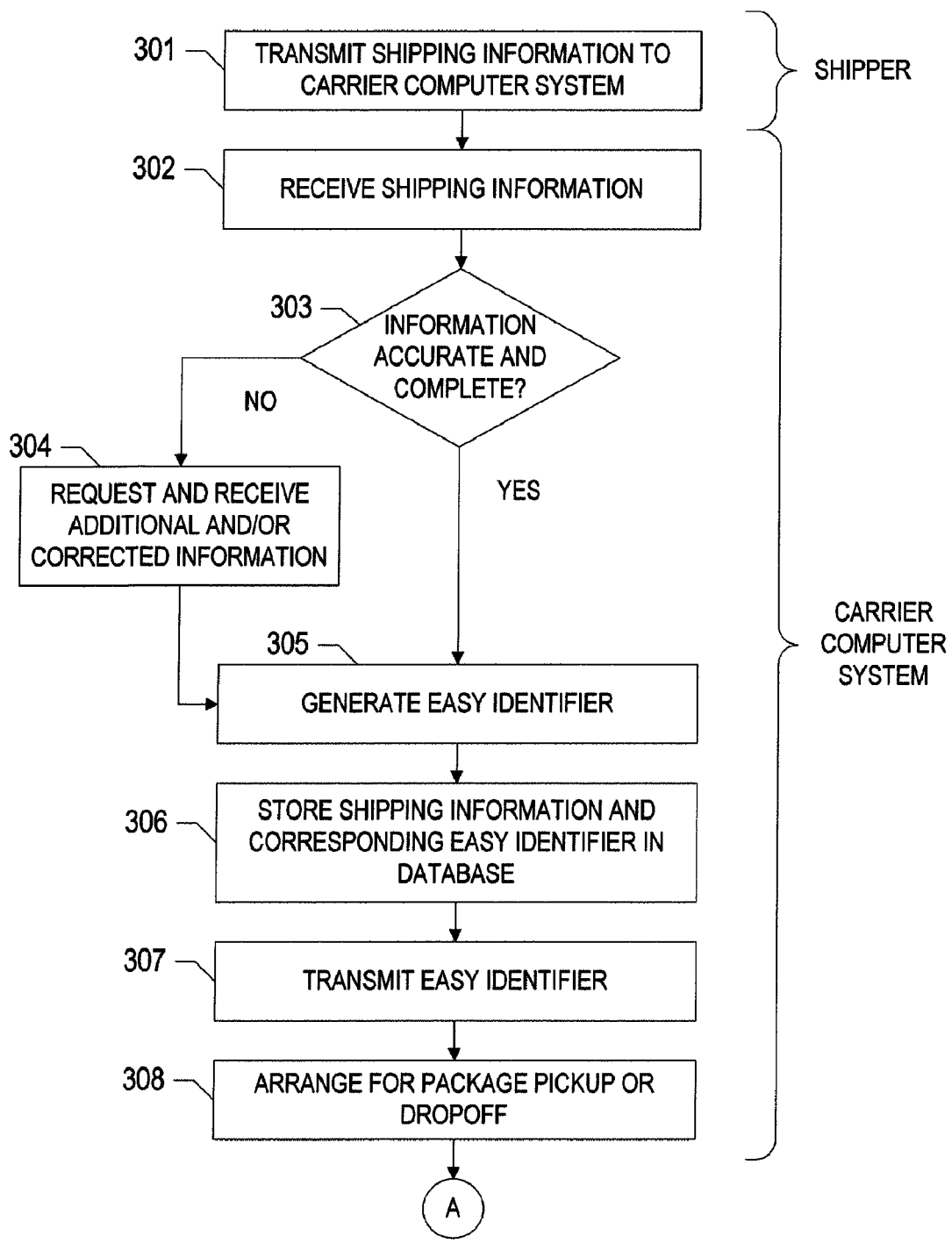
FIGS. 3A and 3B are flow charts illustrating the steps which may be taken in order to ship a package according to exemplary embodiments of the present invention.
Figure 3B:
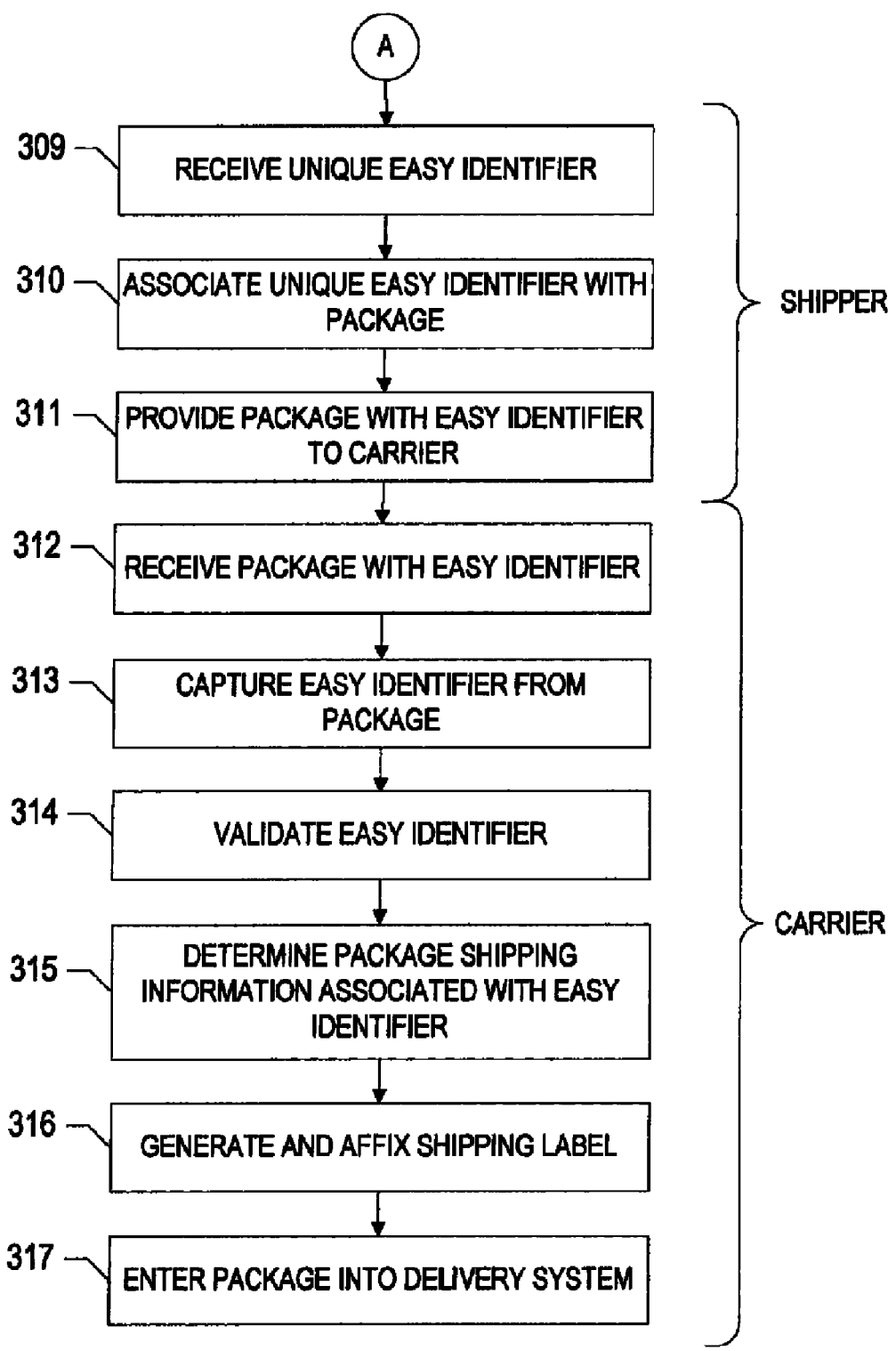

Method of Delivering a Package without the Shipper Being Required to Apply a Shipping Label:

Reference is now made to FIGS. 2, 3A and 3B, which more specifically illustrate the system and method of exemplary embodiments of the present invention. In particular, FIGS. 3A and 3B provide a flow chart illustrating the steps which may be taken in order to deliver a package using the method of exemplary embodiments of the present invention. These steps will hereinafter be discussed in conjunction with FIG. 2, which illustrates, in more detail, the system of exemplary embodiments of the present invention.

As shown, the process begins at Step 301, in which the shipper 110 uses a shipper device 100 to transmit shipping information (also referred to herein as "shipment data"), relating to a package 120 he or she would like to ship, to the carrier computer system 300 via a communication network 200. Shipping information may include, for example, the name and address of the intended recipient, the number of packages being shipped, the size and/or weight of the package, if known, handling instructions, delivery method (e.g., overnight or standard shipping), and any other similar information. Alternatively, the shipping information may be provided implicitly by, for example, identifying and selecting some or all of the above-stated information from a menu provided to the shipper 110 by the carrier computer system 300 that includes previously stored shipping preferences or previous shipping information. For example, the shipper 110 may have identified a preferred delivery method and/or the addresses of the most common recipients of packages shipped by the shipper 110. Upon establishing a connection with the carrier computer system 300 and commencing the shipping process, the carrier server 310 may provide a menu of these previously stored preferences, previous shipments, or both, from which the shipper may select.

In addition to the foregoing, the shipper 110 may provide the carrier computer system 300 with information regarding the current location of the shipper 110, shipper device 100 or package 120. In one exemplary embodiment, the shipper 110 may manually enter his or her current location, such as the name and/or address of the hotel or airport in which he or she is located. Alternatively, or in addition, the shipper 110 may be capable of providing more general information, such as names of buildings, businesses or landmarks in his/her vicinity, for example where the shipper 110 is not that familiar with the area. The shipper device 100 may further comprise a location determining device, such as a Global Positioning System (GPS) device 115, for providing location information in the form of, for example, latitude and longitude values.

In one exemplary embodiment, the shipper device 100 may store and execute a software application that enables the user to interact with the carrier computer system 300 and, in particular the carrier server 310. For example, the shipper 110 may have downloaded and installed software that is associated with a particular carrier (e.g., UPS), which enables the user to enter the requisite shipping information and transmit that information to the carrier server 310. In one exemplary embodiment, the application may require that the shipper 110 manually enter the aforementioned shipping information, for example, using a keypad or touch screen to fill in certain fields of an application-type screen displayed on the shipper device 100. Alternatively, the application may allow the shipper 110 to provide the information using one or more voice commands or even an image, for example, of the package 120 being shipped. To illustrate, in one exemplary embodiment, the shipper 110 may be able to simply speak the name of party to whom he or she would like to send the package 120, or a location associated with the origination or destination of the package 120 (e.g., home or office). The shipper device 100, and in particular, the application operating on the shipper device 100, may then access previously stored information associated with the particular voice command provided (e.g., a street address associated with the party or location) and use this information to communicate the shipping information to the carrier computer system 300. Alternatively, or in addition, the shipper 110 may use his or her shipper device 100 to capture an image of the package 120 being shipped (e.g., a digital photograph), wherein the package displays some unique characteristics (e.g., the shipper's signature), and then include this image with the shipping information communicated to the carrier computer system 300. The image may, thereafter, be used by the carrier upon receipt of the package 120 to verify that the correct package has been picked up, discussed below.

Alternatively, rather than having a separate software application operating on the shipper device 100, the shipper device 100 may comprise an HTML browser that enables the shipper 110 to access a website associated with the carrier (e.g., www.ups.com), in order to enter the shipping information. In another exemplary embodiment, the shipper 110 may use his shipper device 100 to send a text message (e.g., a SMS message) including some or all of the requisite shipping information to the carrier system. In yet another exemplary embodiment, the shipper 110 may contact, via a landline or cellular telephone, an operator that is associated with the carrier and who is responsible for acquiring the requisite shipping information or shipment data from the shipper 110 and entering it into the carrier server 310 him/herself. Alternatively, the shipper 110 may access an Interactive Voice Response (IVR) system to provide the needed shipping information. As noted above, in any of these embodiments, the shipper device 100 may or may not in fact be associated with the shipper 110. For example, the shipper 110 may use his or her personal cellular telephone, PDA or laptop. Alternatively, the shipper 110 may use a payphone or computer available in, for example, a hotel lobby or airport, to access the carrier's website or contact the carrier's operator.

Once the carrier server 310 receives the shipping information (Step 302), the carrier server 310, in Step 303, first determines whether the information received is accurate and complete. If the shipping information received is not complete or accurate, the carrier server 310 may transmit a request to the shipper 110 (via the shipper device 100) for additional or corrected information (Step 304). Assuming the shipping information originally received is sufficient (or the carrier server 310, has received, in response to its request, the additional or corrected information), the carrier server 310 generates a unique easy identifier 150 corresponding with the shipping information (Step 305), and stores the easy identifier 150 along with, and mapped to, the shipping information in a data storage unit 320 (Step 306). In other words, the carrier server 310 associates the easy identifier 150 with the shipping information received. The carrier server 310, in Step 307, transmits the unique easy identifier 150 to the shipper device 110.

The unique easy identifier 150 may comprise, for example, a numeric or alphanumeric code of varying length. In one exemplary embodiment, the unique easy identifier 150 may comprise a self check code or check digit that lessens the probability that the shipper 110 will use the incorrect identifier. In particular, as is known by those of ordinary skill in the art, using a formula, a check digit may be created for each new easy identifier that is then included somewhere within the easy identifier. When the easy identifier, including the check digit, is checked or verified, the data entry program will recalculate the check digit and compare it to the check digit of the easy identifier entered. If the two digits are not equal, the easy identifier is considered invalid. In contrast, if the two digits are equal, the easy identifier is considered valid. In addition, or alternatively, the easy identifier 150 may comprise a string of numbers that has some significance to the shipper 110, also increasing the odds that the shipper 110 will use the correct identifier. For example, at least some of the numbers in the easy identifier 150 may comprise the shipper's 110 telephone number or street address. In fact, in one exemplary embodiment, the user may be given the opportunity to self-select all or part of the unique easy identifier.

In addition to transmitting the unique easy identifier 150 to the shipper 110, in one exemplary embodiment, the carrier server 310 also arranges for drop off or pickup of the package 120, in Step 308. In particular, using the geographic location information relating to the shipper's 110 (or perhaps just the package's 120) current location transmitted and received in Steps 301 and 302, respectively, the carrier server 310 may determine the nearest drop off locations, such as one or more drop off boxes 440 and/or manned carrier facilities 430 (e.g., The UPS Store), and transmit information regarding those locations to the shipper 110. For example, the carrier server 310 may determine which drop off boxes 440 or facilities 430 are within a geographic area proximate to the shipper 110 and/or the package 120. In one exemplary embodiment, the information transmitted to the shipper 110 may be in the form of a map pointing out those locations and providing their address. In addition, the information transmitted may include the hours of operation of the facilities 430, the last pickup time for the drop off boxes 440, or both. In one exemplary embodiment, the carrier server 310 may transmit a link to a website (e.g., www.mapquest.com) that provides a map including the nearest drop-off box 440 or facility 430, as well as a means by which the user can enter his or her current location and receive driving directions to the nearest drop-off box 440 or facility 430.

Alternatively, and likely based on the shipper's 110 preference, the carrier server 310 may determine the nearest carrier vehicle 420 that can be dispatched to the shipper's location in order to pick up the package. The carrier server 310 may also determine what time the delivery vehicle 420 would be available for package pickup and provide this information to the shipper 110. If it is determined that the shipper 110 prefers to have the package picked up, and that the available time is convenient for the shipper 110, the carrier server 310 may then dispatch the carrier vehicle 420 for pickup.

In one exemplary embodiment, prior to receiving the aforementioned information, the shipper 110 may specify, for example as part of the shipping information transmitted in Step 301, whether he or she 110 wants to drop off the package at a drop-off box 440 or facility 430, or if he or she would prefer to have the package picked up by the carrier. Alternatively, in another exemplary embodiment, the carrier server 310 may provide information regarding all options for shipment, and the shipper 110 can then respond with his or her selection.

The process continues, as shown in FIG. 3B, when the shipper 110 receives the unique easy identifier 150 from the carrier server 310 (Step 309). The shipper 110 can, in Step 310, associate the easy identifier 150 with the package 120. This may be done, for example, by merely handwriting the easy identifier 150 on the package 120 itself. Using the method of exemplary embodiments of the present invention, therefore, the shipper 110 is no longer required to generate (or have generated) a shipping label that must be printed and affixed to the package. As a result, the method greatly reduces the amount of equipment and/or supplies a shipper 110 must have in order to ship a package; thus, enabling the shipper 110 to easily ship packages, for example, when he or she is away from home or traveling. Alternatively, if the shipper device 100 is equipped with a printing device 125, the shipper 110 can print out a label with the easy identifier 150 and apply it to the package 120. The easy identifier 150 can be human-readable or machine-readable, such as a barcode or an RFID tag.

Once the shipper 110 has associated the unique easy identifier 150 with the package 120, he or she provides the package to the carrier by, for example, either taking the package 120 to a drop off box 440 or facility 430, or handing the package 120 to the driver of a dispatched carrier vehicle 420 (Step 311). Regardless of how the carrier 410 (i.e., the individual responsible for delivering the package—not the company by which he or she is employed) receives the package 120 (in Step 312), upon receipt, the carrier 410, in Step 313, captures the easy identifier 150 from the package. This may be done by, for example, manually entering the easy identifier into the keypad of his or her carrier device 400 or, alternatively, using a barcode or RFID reader associated with the carrier device 400 to scan the easy identifier 150.

Once the easy identifier 150 has been captured, the carrier 410, in Step 314, validates the unique easy identifier 150. In particular, the carrier 410 verifies, based on the unique easy identifier 150, that the package is in fact authorized for shipment. This may involve, for example, entering the unique easy identifier 150 into the carrier device 400 and cross-referencing the identifier with information either stored on the data storage unit 320 or on the actual carrier device 400. In one exemplary embodiment, this may further include comparing the image of the package provided by the shipper 110 in connection with the other shipping information with the actual package 120 being picked up to make sure that they are one and the same. Once the easy identifier 150 has been validated, the carrier 410 uses the unique easy identifier 150 to determine the shipping information relating to that package 120 (Step 315).

In one exemplary embodiment, in order to determine the shipping information corresponding to the unique easy identifier 150 associated with the package 120, the carrier 410 manually enters the easy identifier into his or her carrier device 400, and then uses the carrier device 400 to access the data storage unit 320 of the carrier computer system 300 (i.e., over the network 200) and retrieve the corresponding shipping information. The retrieved shipping information may then be displayed on the carrier device 400 for verification. In another exemplary embodiment, prior to being dispatched to pick up the package 120 from the shipper 110, drop-off box 440 or facility 430 (and presumably other packages similarly marked from other shippers at various locations), the carrier 410 may have downloaded the unique easy identifier 150 and corresponding shipping information for all packages being picked up to his or her carrier device 400. In this exemplary embodiment, upon receipt of the package 120, the carrier 410 need not communicate with the carrier computer system 300 at all, since the shipping information needed to generate the shipping label would be stored directly on his or her carrier device 400.

Assuming the package is authorized for shipment, in Step 316, the carrier 410 uses the shipping information to generate a shipping label 500 and affix the label 500 to the package 120'. In one exemplary embodiment, the equipment (i.e., the label generation device 450 and printing device 460) and supplies required for printing the shipping labels 500 are carried within the carrier vehicle 420 and/or facility 430. Alternatively, or in addition, the carrier device 400 itself may possess the requisite equipment. Finally, the package 120', which now displays a standard shipping label 500, can be entered into the delivery system according to the customary method (Step 317).

Conclusion:

As described above and as will be appreciated by one skilled in the art, embodiments of the present invention may be configured as a system, method or carrier server. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Exemplary embodiments of the present invention have been described above with reference to block diagrams and flowchart illustrations of methods, systems, and devices. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of shipping a package from any location that eliminates the need for a user to apply a shipping label to the package, said method comprising:
    receiving, by a carrier computer system comprising at least one processor, shipment data for shipping a package from a user device via a communications network, wherein the shipment data comprises an indication of a destination of the package to be shipped;
    generating, by the carrier computer system, a human readable easy identifier, wherein the easy identifier is distinct from the shipment data and postage data;
    linking the easy identifier with the shipment data received;
    transmitting the human readable easy identifier to the user device via the communications network, said easy identifier configured to be associated with the package, so that the user can read the human readable easy identifier and associate the easy identifier with the package without using a machine, and wherein the package does not otherwise include an indication of a destination;
    receiving a signal from a carrier device, said signal comprising the easy identifier associated with the package, said easy identifier having been captured from the package by the carrier device;
    retrieving the shipment data based on the easy identifier; and
    transmitting the shipment data to the carrier device for generating a shipping label based at least in part on the transmitted shipment data, wherein the shipping label is configured to be affixed to the package by a carrier at a pickup processing location upon receipt of the package associated with the easy identifier.

2. The method of claim 1 further comprising:
    validating the easy identifier captured by the carrier device, wherein the shipment data is retrieved and the shipping label is generated only upon validation of the easy identifier.

3. The method of claim 1 further comprising:
    storing the shipment data in a data storage unit, wherein linking the easy identifier with the shipment data comprises mapping the easy identifier to the shipment data in the data storage unit.

4. The method of claim 1 further comprising:
    receiving geographic location data indicating a location of at least one of the user device, the package or the user.

5. The method of claim 4, wherein receiving the geographic location data comprises receiving the geographic location data from a global positioning system (GPS) device associated with the user device.

6. The method of claim 4, wherein receiving the geographic location data comprises receiving the geographic location data from the user device, wherein the geographic location data has been input into the user device by the user.

7. The method of claim 4 further comprising:
    determining one or more drop-off locations within a geographic area proximate to at least one of the user device, the package or the user based at least in part on the geographic location data received; and
    transmitting an indication of the one or more drop-off locations to the user device.

8. The method of claim 7 further comprising:
    generating a map indicating the one or more drop-off locations, wherein transmitting an indication of the one or more drop-off locations to the user device comprises transmitting the map to the user device for display to the user.

9. The method of claim 7, wherein the one or more drop-off locations comprise one or more drop boxes.

10. The method of claim 7, wherein the one or more drop-off locations comprise one or more carrier facilities.

11. The method of claim 4 further comprising:
    selecting a carrier vehicle capable of picking up the package based at least in part on the geographic location data received; and
    causing dispatch of the selected carrier vehicle.

12. The method of claim 1 further comprising:
    determining whether the shipment data received is sufficient to enable generation of a shipping label; and
    transmitting a request for additional information to the user device upon a determination that the shipment data is not sufficient.

13. The method of claim 1, wherein the user device comprises a mobile communication device capable of communicating wirelessly over the communications network.

14. The method of claim 1, wherein the pickup processing location is a carrier facility.

15. The method of claim 1, wherein the pickup processing location is a carrier vehicle.

16. A system for use in shipping a package from any location that eliminates the need for a user to apply a shipping label to the package, said system comprising:
    a carrier server configured to receive shipment data for shipping a package from a user device via a communication network and storing the shipment data received, wherein the shipment data comprises an indication of a destination of the package to be shipped, the carrier server further configured to generate a human readable easy identifier and link the easy identifier with the stored shipment data, such that the shipment data can be retrieved based on the easy identifier, said carrier server further configured to transmit the human readable easy identifier to the user device, said easy identifier configured to be associated with the package by the user, so that the user can read the human readable easy identifier and associate the easy identifier with the package without using a machine, and wherein the easy identifier is distinct from the shipment data and postage data;
    a data acquisition device configured to capture a human readable indication of the easy identifier from a package with which the easy identifier is associated, said data acquisition device further configured to retrieve the shipment data stored by the carrier server using the captured easy identifier, wherein the package does not otherwise include an indication of a destination;
    a label generation device in communication with the data acquisition device, said label generation device configured to generate a shipping label based at least in part on the shipment data retrieved by the data acquisition device; and
    a printing device in communication with the label generation device, said printing device configured to print the shipping label, wherein the shipping label is capable of being affixed by a carrier at a pickup processing location upon receipt of the package associated with the easy identifier.

17. The system of claim 16 further comprising:
    a data storage unit accessible by at least the carrier server and the data acquisition device, wherein storing the shipment data received comprises storing the shipment data in the data storage unit, and wherein linking the easy identifier with the stored shipment data comprises mapping the easy identifier to the stored shipment data in the data storage unit.

18. The system of claim 16 further comprising:
a user device configured to transmit the shipment data to the carrier server and receive the easy identifier from the carrier server.

19. The system of claim 18, wherein the carrier server is further configured to receive geographic location data indicating a location of at least one of the user device, the package, or the user.

20. The system of claim 19 further comprising:
a global positioning system (GPS) device associated with the user device, wherein receiving geographic location data comprises receiving the geographic location data from the GPS device.

21. The system of claim 19, wherein the carrier server is further configured to determine one or more drop-off locations within a geographic area proximate to at least one of the user device, the package, or the user based at least in part on the geographic location data received, and transmit an indication of the one or more drop-off locations to the user device.

22. The system of claim 21, wherein the carrier server is further configured to generate a map indicating the one or more drop-off locations, and wherein transmitting an indication of the one or more drop-off locations to the user device comprises transmitting the map to the user device for display to the user.

23. The system of claim 19, wherein the carrier server is further configured to select a carrier vehicle capable of picking up the package based at least in part on the geographic location data received, and cause dispatch of the selected carrier vehicle.

24. A carrier server capable of providing shipment of a package from any location without the need for a user to apply a shipping label to the package, said carrier server comprising:
a processor; and
a memory in communication with the processor, said memory storing an application executable by the processor, said application configured to, upon execution:
receive, by the carrier server, shipment data for shipment of a package from a user device via a communication network, wherein the shipment data comprises an indication of a destination of the package to be shipped;
generate, by the carrier server, a human readable easy identifier, wherein the easy identifier is distinct from the shipment data and postage data;
link the easy identifier with the shipment data received;
transmit the human readable easy identifier to the user device, said easy identifier configured to be associated with the package, so that the user can read the human readable easy identifier and associate the easy identifier with the package without using a machine, and wherein the package does not otherwise include an indication of a destination;
receive a signal from a carrier device, said signal comprising the easy identifier associated with the package, said easy identifier having been captured by the carrier device;
retrieve the shipment data using the easy identifier; and
transmit the shipment data to the carrier device for generating a shipping label based at least in part on the transmitted shipment data, wherein the shipping label is configured to be affixed to the package by a carrier at a pickup processing location upon receipt of the package associated with the easy identifier.

25. The carrier server of claim 24, wherein the application is further configured to, upon execution, receive geographic location data indicating a location of at least one of the user device, the package, or the user.

26. The carrier server of claim 25, wherein the application is further configured to, upon execution, determine one or more drop off locations within a geographic area proximate to at least one of the user device, the package, or the user based at least in part on the geographic location data received, and transmit an indication of the one or more drop-off locations to the user device.

27. The carrier server of claim 26, wherein the application is further configured to, upon execution, generate a map indicating the one or more drop-off locations, and wherein transmitting an indication of the one or more drop-off locations to the user device comprises transmitting the map to the user device for display to the user.

28. The carrier server of claim 25, wherein the application is further configured to, upon execution, select a carrier vehicle capable of picking up the package based at least in part on the geographic location data received, and cause dispatch of the selected carrier vehicle.

29. A method comprising the step of:
entering shipment data for shipping a package into a user device, wherein the shipment data comprises an indication of a destination of the package to be shipped;
transmitting the shipment data by the user device to a carrier computer system via a communications network;
by the carrier computer system,
in response to receiving the shipment data, generating, by a processor, a human readable easy identifier, wherein the easy identifier is distinct from the shipment data and postage data;
storing the shipment data;
linking the shipment data with the easy identifier;
transmitting the human readable easy identifier from the carrier computer system to the user device via the communications network, so that a user can read the human readable easy identifier and associate the easy identifier with the package without using a machine;
in response to receiving, by the user device, the easy identifier, associating the easy identifier with the package;
providing the package with the associated easy identifier to the carrier for delivery to a destination indicated by the shipment data;
by the carrier,
receiving the package with associated easy identifier at a pickup processing location of the carrier, wherein the package does not otherwise include an indication of a destination;
retrieving the shipment data from the carrier computer system at the pickup processing location based on the easy identifier;
generating a shipping label based at least in part on the retrieved shipment data at the pickup processing location;
applying the shipment label to the package at the pickup processing location; and
shipping the package based on the shipment data on the shipment label.

* * * * *

UNITED STATES PATENT AND TRADEMARK OFFICE
CERTIFICATE OF CORRECTION

PATENT NO. : 8,010,463 B2  Page 1 of 1
APPLICATION NO. : 11/425033
DATED : August 30, 2011
INVENTOR(S) : Gillen It is certified that error appears in the above-identified patent and that said Letters Patent is hereby corrected as shown below:

Title page,
Item (75) Inventor: "Bob Gillen" should read --Robert J. Gillen--.

Signed and Sealed this
Eleventh Day of March, 2014

Michelle K. Lee
*Deputy Director of the United States Patent and Trademark Office*